United States Patent [19]
Blanchard

[11] Patent Number: 5,810,443
[45] Date of Patent: Sep. 22, 1998

[54] SEAT STRUCTURE HAVING A VARIABLE CONFIGURATION FOR A MOTOR VEHICLE

[75] Inventor: Jean Marie Blanchard, Nogent-Sur-Vernisson, France

[73] Assignee: CESA - Compagnie Europeenne De Sieges Pour Automobiles, Perret, France

[21] Appl. No.: 770,835

[22] Filed: Dec. 20, 1996

[30] Foreign Application Priority Data

Dec. 22, 1995 [FR] France .................................. 95 15413

[51] Int. Cl.⁶ ....................................................... B60N 2/02
[52] U.S. Cl. ..................... 297/378.12; 297/336; 296/65.1
[58] Field of Search ........................... 297/378.1, 378.12, 297/378.14, 335, 336; 296/65.1

[56] References Cited

U.S. PATENT DOCUMENTS

| | | | |
|---|---|---|---|
| 5,238,285 | 8/1993 | Holdampf et al. . | |
| 5,368,355 | 11/1994 | Hayden et al. . | |
| 5,393,116 | 2/1995 | Bolsworth et al. | 296/65.1 |
| 5,482,345 | 1/1996 | Bolsworth et al. | 297/336 X |
| 5,577,805 | 11/1996 | Glinter et al. | 296/65.1 X |
| 5,593,208 | 1/1997 | Mitschelen et al. | 296/65.1 X |

FOREIGN PATENT DOCUMENTS

| | | |
|---|---|---|
| 2556946 | 6/1985 | France . |
| 2625955 | 7/1989 | France . |
| 2687621 | 8/1993 | France . |
| 2699973 | 7/1994 | France . |

Primary Examiner—Laurie K. Cranmer
Attorney, Agent, or Firm—Sughrue, Mion, Zinn, Macpeak & Seas, PLLC

[57] ABSTRACT

The seat structure comprises a frame (12) carrying a seat (14), a backrest (16) and at least one leg (20). The backrest (16) is mounted on the frame (12) to be pivotable between at least one position adapted to receive an occupant and at least one position inadapted to receive the occupant. The leg (20) is provided with a ball-type lock (28) for fixing the seat structure to a floor of the vehicle. This lock comprises a rod (32) movable between a lock locking position and a lock unlocking position. The seat (14) is connected to the backrest (16) by a mobile control linkage 46 which ensures that the position of the seat (14) is governed by the position the backrest (16). The seat structure further comprises means (58) for immobilizing the control linkage (46) when the backrest (16) is in a position inadapted to receive an occupant and the rod (32) is in an unlocking position.

20 Claims, 11 Drawing Sheets

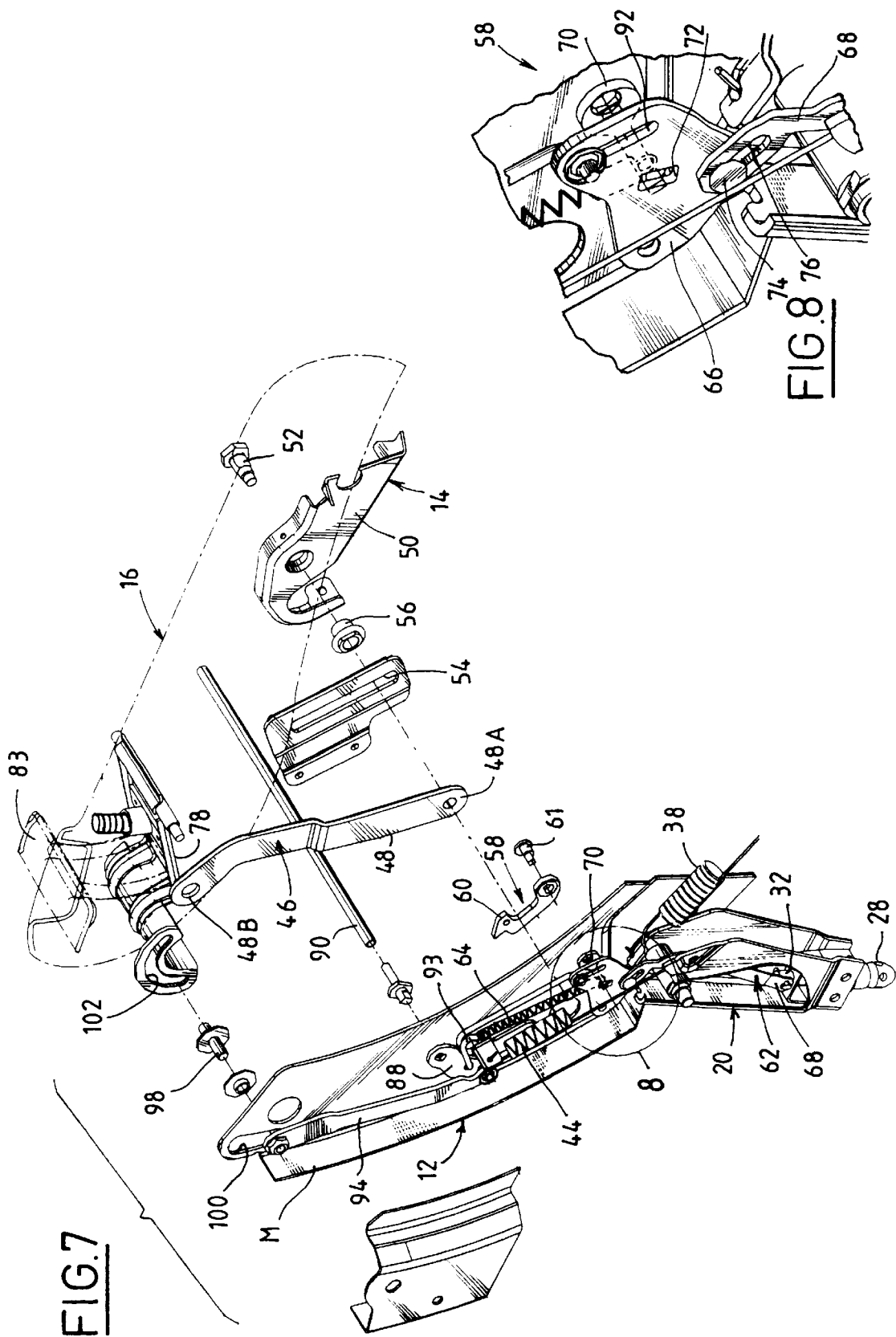

SEAT STRUCTURE HAVING A VARIABLE CONFIGURATION FOR A MOTOR VEHICLE

BACKGROUND OF THE INVENTION

The present invention relates to a seat structure having a variable configuration for a motor vehicle.

There is already known in the art a seat structure having a variable configuration for a motor vehicle, of the type comprising a frame carrying a seat, a backrest and at least one leg, the backrest being mounted on the frame to be pivotable between at least one position adapted to receive an occupant and at least one position inadapted to receive this occupant, the leg being provided with a ball-type lock for fixing the seat structure to a floor of the vehicle, said lock comprising a rod movable between a lock locking position and lock unlocking position.

FR-A-2 699 973 (FR-A-92 15 857) discloses a seat structure of this type which may be removably secured to the floor of the passenger compartment or cell of a motor vehicle of the monospace type. The backrest is movable into three successive positions adapted to receive an occupant, namely "bed", "relaxation" and "normal" positions, and into two successive positions inadapted to receive this occupant, namely "table" and "compact" positions.

Usually, the seat structure is provided with a safety or seat belt having three anchoring points carried by the seat structure. For reasons of safety, it is essential to ensure that, when the seat structure is in a position adapted to receive an occupant, the lock is correctly secured to the floor.

SUMMARY OF THE INVENTION

An object of the invention is to propose in particular a removable seat structure whose attachment to the floor is sufficiently reliable to resist, in the event of a shock, the forces transmitted to this seat structure by the safety belt, it being impossible for the occupant to use the seat structure if it is not correctly attached to the floor.

For this purpose, the invention provides a seat structure having a variable configuration for a motor vehicle, of the aforementioned type, characterized in that the seat is connected to the backrest by a mobile control linkage which ensures that the position of the seat is governed by the position of the backrest, and the seat structure further comprises means for immobilizing the control linkage when the backrest is in a position inadapted to receive an occupant and the rod is in said unlocking position thereof.

According to other features of the invention:

the control linkage comprises an articulation pin slidably mounted in a guide connected to the frame, and the immobilizing means comprise a hook mounted on the frame to be pivotable between a position for immobilizing and a position for releasing the articulation pin, and a transmission linkage for transmitting the movements of the rod of the lock connecting said rod to the hook, the rod being resiliently biased to a locking position by means opposing means for resiliently biasing the hook to the immobilizing position, the force for resiliently biasing the rod being greater than the force for reliantly biasing the hook;

the transmission linkage comprises a shifting plate for shifting the hook, the plate being pivotally mounted on the frame, connected, on one hand, to the rod by means of a link, and, on the other hand, to the hook by means of an arm connected to rotate with the hook;

the arm is connected to the plate by means of a slot provided in the plate which allows a lost travel of the plate and of the rod relative to the hook;

the leg is mounted on the frame to be pivotable between active and retracted positions, the transmission link being connected to the plate by means of an end slot in the link which allows a lost travel of the transmission link relative to the plate when pivoting the leg;

the seat structure comprises means for controlling the unlocking of the lock comprising a control lever mounted on the backrest to be pivotable between a position of rest, to which the lever is resiliently biased and an active position the control lever being connected to the rod of the lock by a control linkage;

the control linkage connected to the rod comprises an intermediate linkage connecting the control lever to the shifting plate;

the intermediate linkage is connected to the plate by means of a slot which is provided in the plate and allows a lost travel of the intermediate linkage relative to the plate, said lost travel allowing, when the rod is in the unlocking position, the return of the control lever to the position of rest;

the seat structure comprises locking means for locking the control lever when the backrest is in a position adapted to receive an occupant;

the control lever locking means comprise a pivot pin of the control linkage movably mounted in two locking slots which are movable relative to each other, one locking slot being carried by the frame and the other being carried by the control lever, the relative orientation of the locking slots being compatible with a displacement of the pivot pin which they guide solely when the backrest is in a position inadapted to receive an occupant;

the leg forms the first of two lateral legs carried by the frame, each leg being provided with the same ball-type lock, the intermediate linkage of the first leg being connected to a crank arm pivotally mounted on the frame and connected to rotate with a bar coupling the intermediate linkage with a control linkage associated with the lock of the second leg;

the two lateral legs form rear legs of the seat structure articulated to the frame, the seat structure further comprising two front legs, also articulated to the frame, and means for ensuring that the position of the rear legs relative to the frame is governed by the position of the front legs relative to the frame;

the backrest is movable into two successive positions adapted to receive an occupant;

the backrest is movable into two successive positions inadapted to receive an occupant.

A better understanding of the invention will be had from the following description which is given solely by way of example with reference to the accompanying drawings, in which:

BRIEF DESCRIPTION OF THE DRAWINGS

FIG. 7 is an exploded perspective view of a part of the seat structure showing in particular the frame and a leg of the seat structure;

FIG. 8 is a detail view of the part within the circle 8 of FIG. 7;

DESCRIPTION OF THE PREFERRED EMBODIMENT

Figure 1:
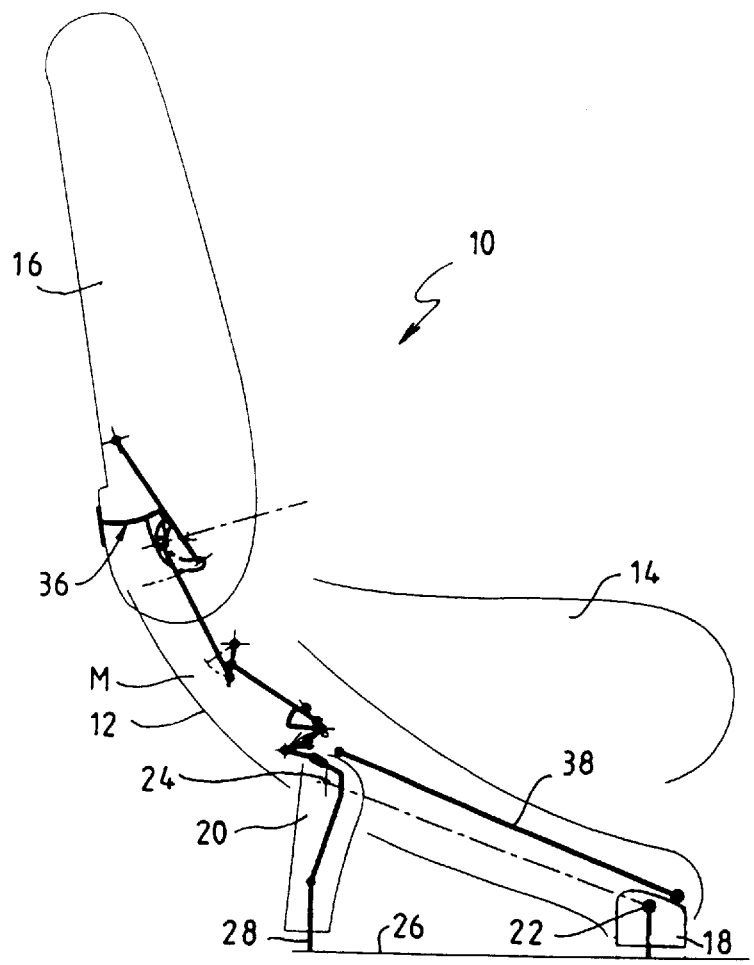
FIGS. 1 to 6 are diagrammatic, elevational views of a seat structure according to the invention in different configurations.

Shown in FIGS. 1 to 6 is a seat structure having a variable configuration, designated by the general reference numeral 10, for a motor vehicle.

Hereinafter, the front, rear, left and right orientations correspond to the usual orientations of an occupant seated in the seat structure 10.

The seat structure 10 comprises a frame 12 provided with two lateral box-like booms M, carrying a seat 14, a backrest 16, two front lateral legs 18 and two rear lateral legs 20.

The seat 14 is movably mounted on the frame 12, as will be subsequently described in more detail.

The backrest 16 is pivotally mounted on the booms M of the frame by means of a conventional articulation, as described for example in FR-A-2 687 621 (FR-A-92 02 172).

The backrest 16 is movable between at least one position adapted to receive an occupant and at least one position inadapted to receive the occupant. In the presently described embodiment, the backrest 16 is movable into two successive positions adapted to receive an occupant and two successive positions inadapted to receive the occupant.

A first position adapted to receive an occupant, turned "normal" position, is shown in FIG. 1 and permits in particular driving the vehicle. The second position adapted to receive an occupant, termed "relaxation" position, is not shown in the Figures. In this second position, the backrest is inclined rearwardly relative to the first position.

Figure 2:
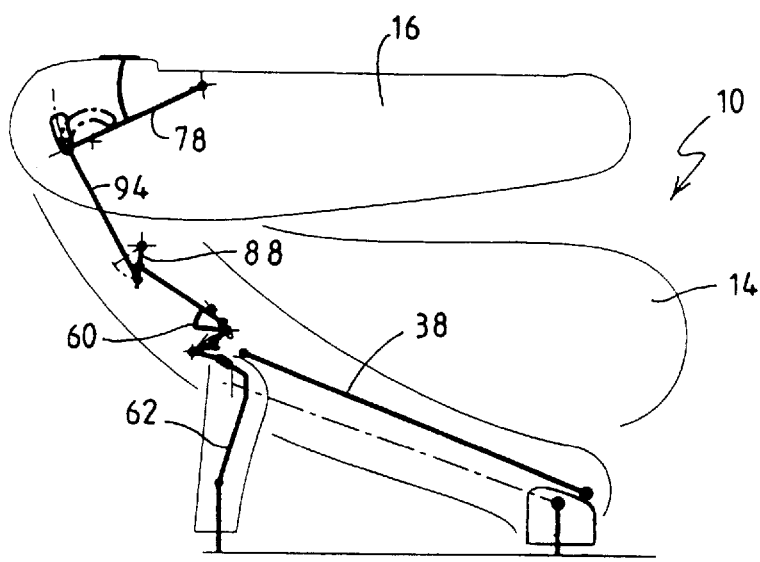
Figure 3:
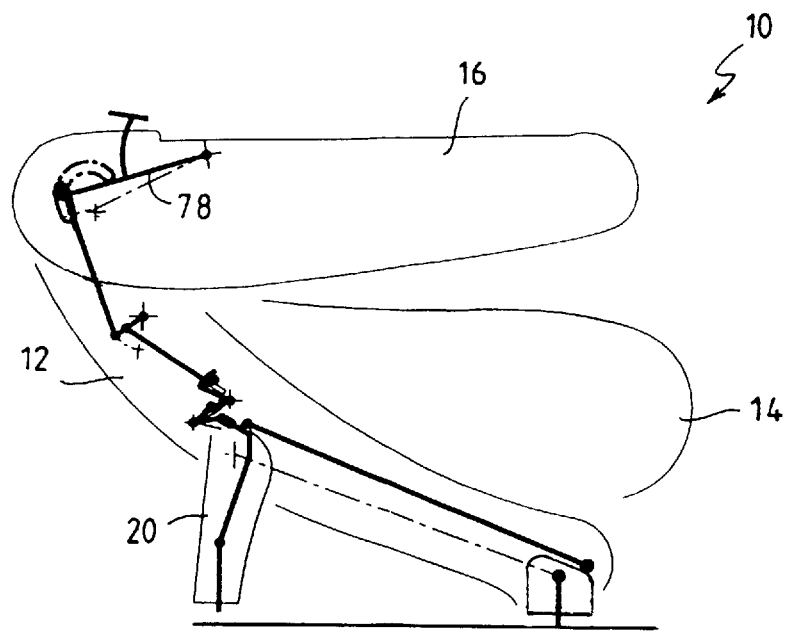
Figure 4:
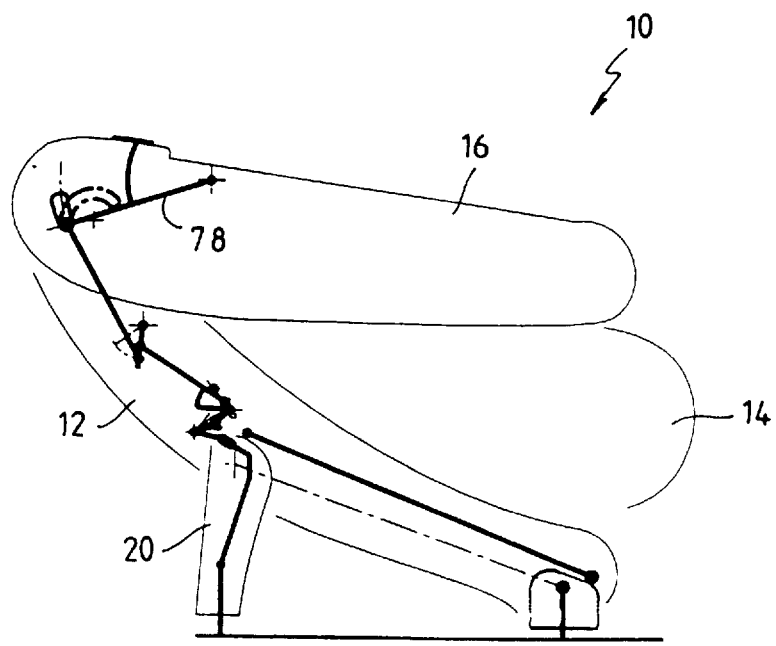
Figure 5:
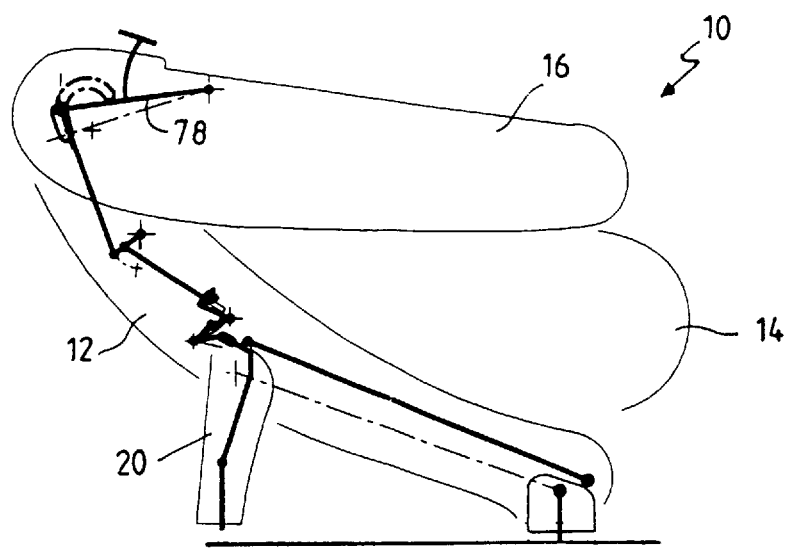

The two positions inadapted to receive an occupant, termed "table" and "compact" positions, are obtained by pivoting the backrest 16 from the rear to the front from its "normal" position, the first position being shown in FIGS. 2 and 3 and the second in FIGS. 4 and 5.

The front legs 18 and the rear legs 20 are pivotally mounted on the booms M of the frame 12 by means of conventional articulations 22, 24.

The seat 10 is removably secured to a floor 26 of the passenger compartment or cell of the vehicle by means of four conventional ball-type locks carried by the four legs of the seat structure.

Figure 15:
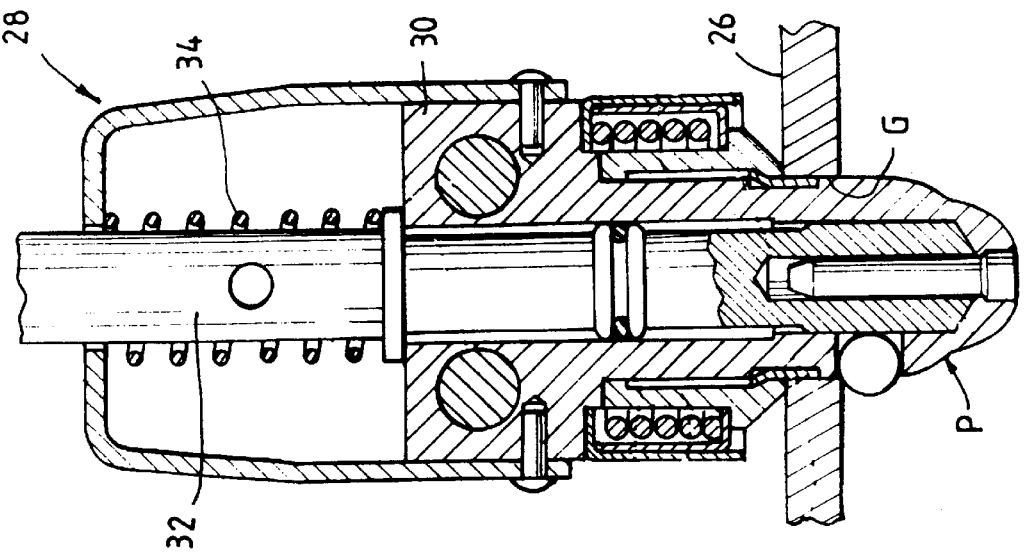
FIGS. 15 and 16 are axial sectional views of the lock respectively in the unlocked position and the locked position.
Figure 16:
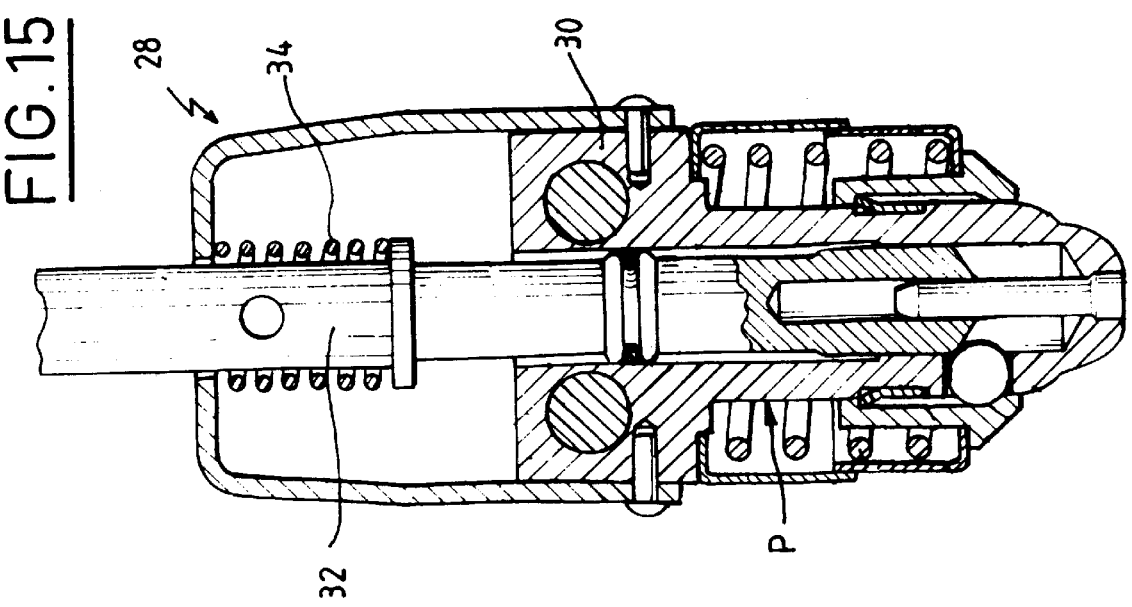

FIGS. 15 and 16 show one of the two identical locks 28 carried by the rear legs 20 of the seat structure. The structure and the operation of this lock are described in detail, for example in the French patent application No. 95 06 868 in the name of the Applicant.

The lock 28 comprises a bolt P carrying balls adapted to be locked by clicking into a locking opening constituting a keeper G provided in the floor 26.

The bolt P comprises a locking body 30 fixed to the corresponding rear leg, and a rod 32 movable between a lock unlocking position and a lock locking position respectively shown in FIGS. 15 and 16.

The rod 32 is resiliently biased or returned to the locking position by a compression spring 34.

The locks 28 of the rear legs may be unlocked by control means 36 which can only be actuated when the seat 10 is in a position inadapted to receive an occupant, such as that shown in FIGS. 3 and 5.

The control means 36, shown in more detail in FIGS. 7 to 11, will be subsequently described.

Figure 6:
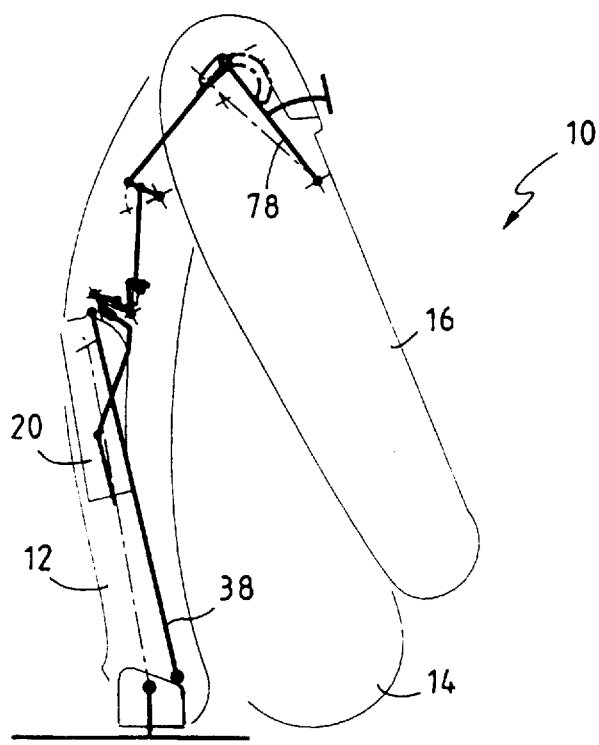

In FIG. 6, the seat structure is shown in a configuration in which it is folded up so as to take up a reduced amount of space on the floor, in which position only the two front legs 18 are secured to the floor. This folded-up configuration is obtained by placing the backrest 16 of the seat structure in the "table" or "conpact" position (see FIG. 2 or 4) by unlocking the rear legs 20 (see FIG. 3 or 4), then by pivoting the seat structure 10 about the pivot axis defined by the articulations 22 connecting the front legs 18 to the booms M of the frame.

Owing to the symetry between the right and left parts of the seat structure 10, only the right part of this seat structure will be described hereinafter.

Figure 17:
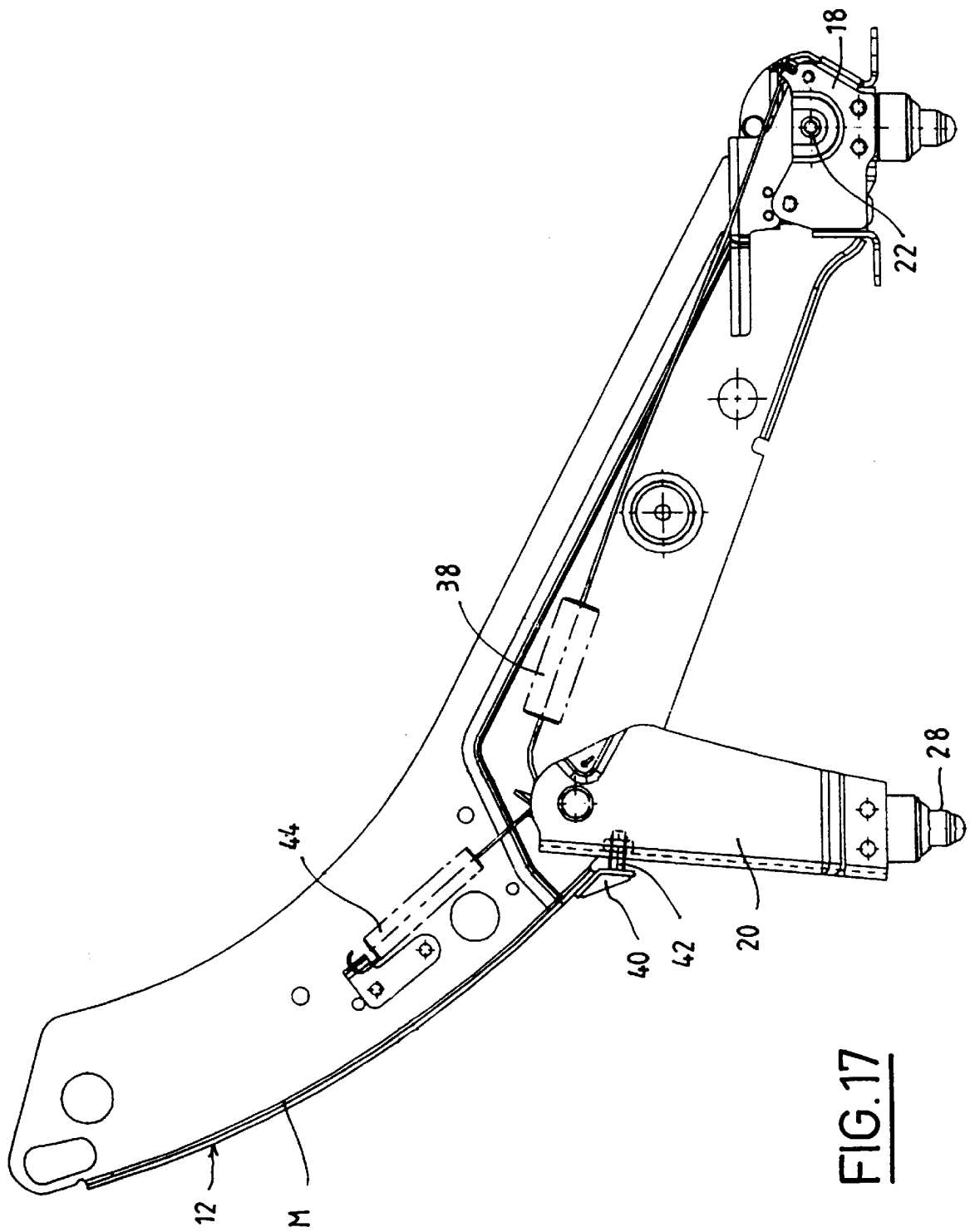
FIGS. 17 and 18 are partial side elevational views of the seat structure according to the invention respectively in two different configurations of the seat structure.
Figure 18:
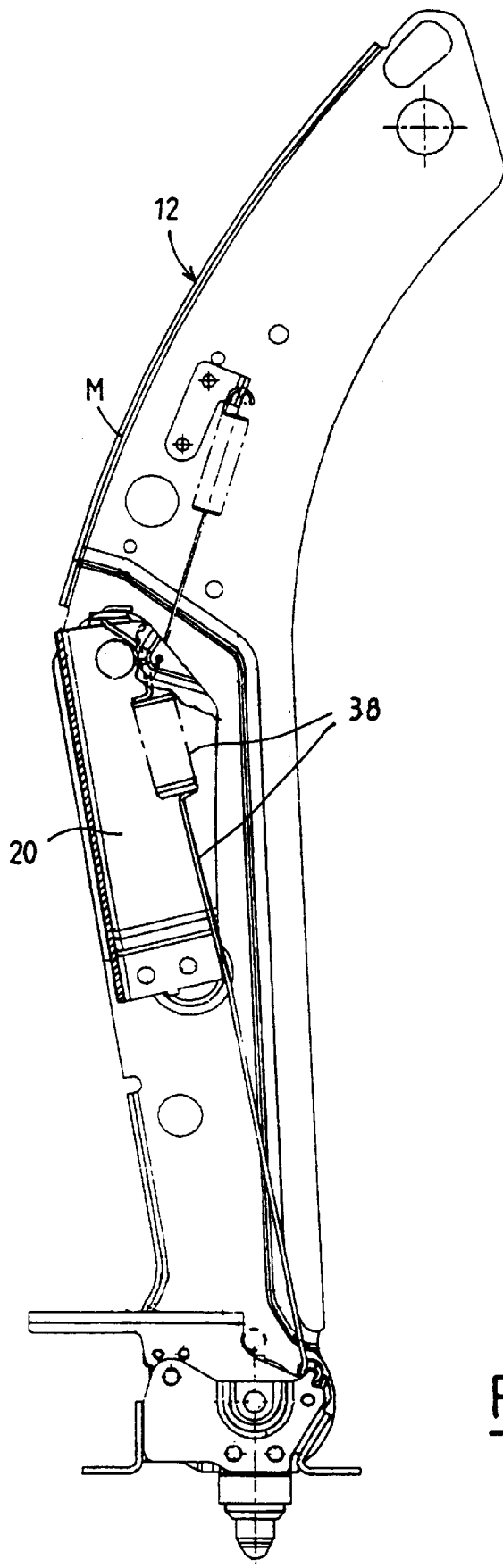

With reference in particular to FIGS. 17 and 18, it can be seen that the position of the rear leg 20 relative to the frame 12 is governed by the position of the front leg 18 relative to the frame, by means of a connecting element 38 articulated at its ends to each of the legs 18 and 20.

It will be observed that the articulations 22, 24 of the front and rear legs 18 and 20 and the articulated ends of the element 38 define a deformable quadrilateral.

Under the effect of the deformation of this quadrilateral, the rear leg 20 is movable between an active position for fixing the seat structure 10 to the floor, such as that shown in particular in FIGS. 1 and 17, and a position in which it is retracted into a boom M of the frame, such as that shown in particular in FIGS. 6 and 18.

Preferably, the element 38 is formed by a very stiff tension spring as shown in FIGS. 17 and 18.

When the rear leg 20 is in the active position, the spring 38 is stretched and biases this rear leg against a positioning stop 40 fixed to the frame 12. This stop 40 cooperates with the end of a screw 42 carried by the rear leg 20. This screw 42 permits adjusting the active position of the rear leg 20 for obtaining, upon locking, a correct relative position of the bolt P and the keeper G with no need to use very close manufacturing tolerances.

When the rear leg 20 is in the retracted position, the spring 38 is completely relaxed and even slightly slack, the rear leg being resiliently returned to its retracted position by a tension spring 44 connected between this leg and the boom M which carries it. The stiffness of the spring 44 is less than that of the spring 38.

In an alternative embodiment, the element 38 may be formed by a rod.

With reference to FIG. 7 in which the backrest 16 is in its "table" position corresponding to that shown in FIG. 2, it can be seen that the seat 14 is connected to the backrest 16 by a mobile control linkage 46 which ensures that the position of the seat 14 is governed by the position of the backrest 16.

The control linkage 46 comprises a link 48 provided with a first end portion 48A articulated to a frame 50 of the seat 14 by means of an articulation pin 52, and a second end portion 48B articulated to a frame of the backrest 16 (not shown in the drawings).

The articulation pin 52 is slidably mounted in a rectilinear guide 54 fixed to the frame 12. Note that the pin 52 is freely rotatively mounted in a sleeve 56 in contact with the guide 54.

The seat structure 10 further comprises means 58 for immobilizing the control linkage 46 when the backrest 16 is in a position inadapted to receive an occupant and the rod 32 is in a lock unlocking position.

Figure 9:
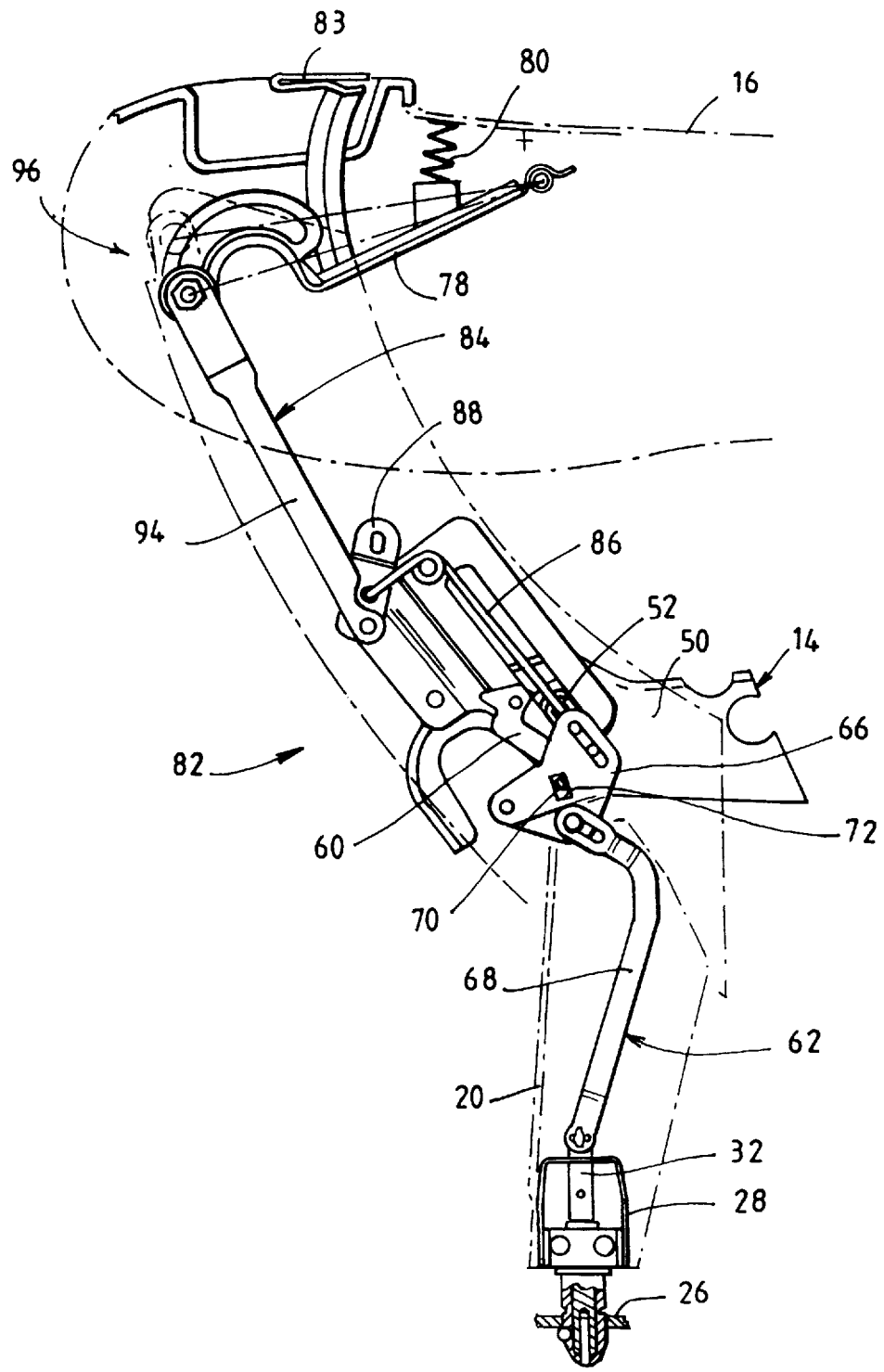
FIGS. 9 to 11 are side elevational views of the part of the seat structure shown in FIG. 7, in different configurations of the seat structure.
Figure 10:
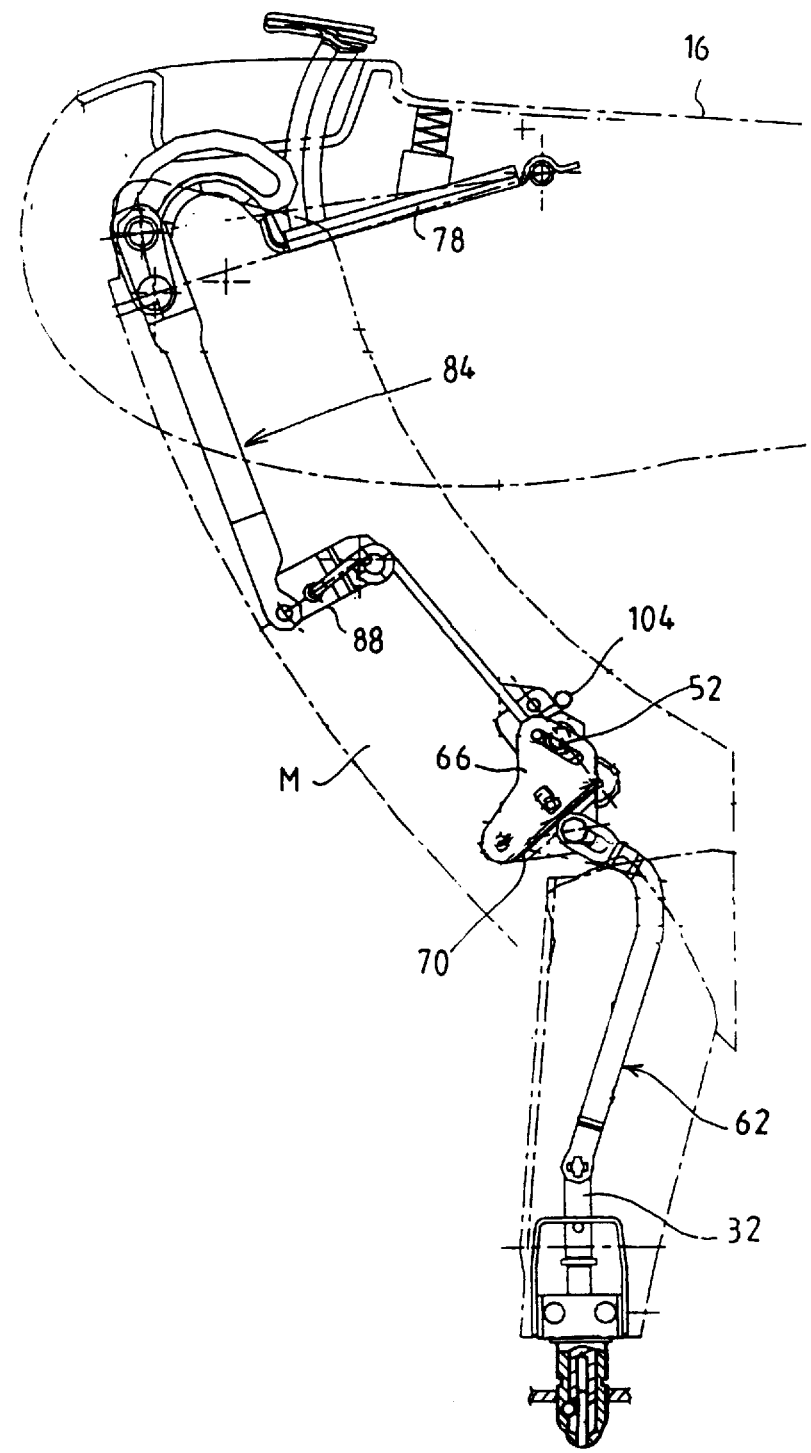
Figure 11:
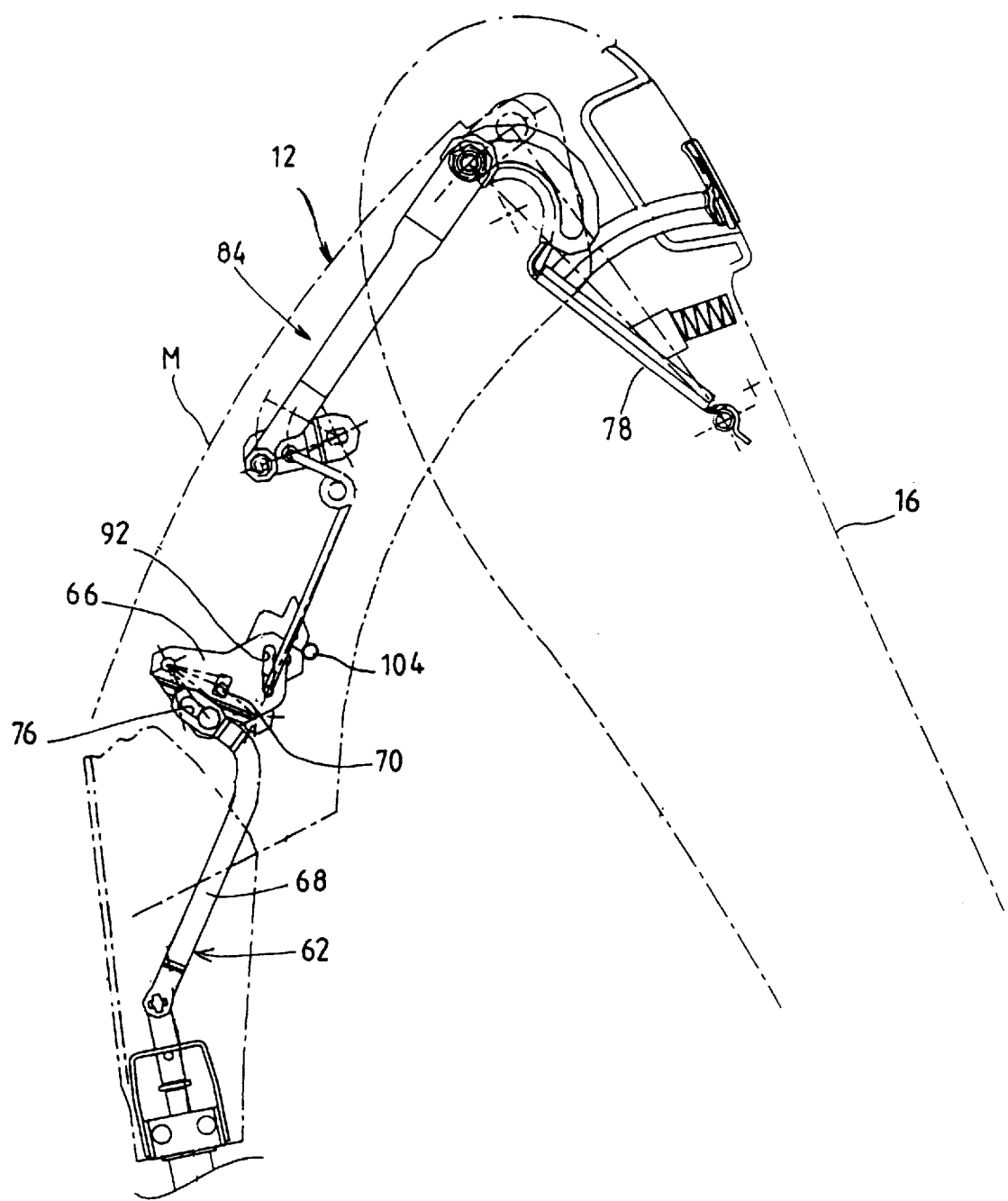

These means 58, illustrated in FIGS. 7 to 11, comprise a hook 60 pivotally mounted by a stud 61 on the boom M of the frame for pivoting between a position for releasing the articulation pin 52, as shown in FIG. 9, and a position for immobilizing the pin 52, as shown in FIGS. 10 and 11.

The immobilizing means 58 further comprise a transmission linkage 62 for transmitting movements of the rod 32 and connecting the latter to the hook 60.

The spring 34 for biasing the rod 32 opposes a spring 64 for resiliently biasing or returning the hook 60 to the immobilizing position. The stiffness of the spring 34 is greater than the stiffness of the spring 64 so that the force biasing the rod 32 is greater than that biasing the hook 60.

The transmission linkage 62 comprises a plate 66, pivotally mounted on the boom M of the frame, for shifting the hook 60. The plate 66 is connected, on one hand, to the rod 32 by means of a cranked link 68 and, on the other hand, to the hook 60 by means of an arm 70 connected to rotate with this hook.

The arm 70 has a free end for connection with the plate 66 disposed with clearance in a rectangular slot 72 provided in the plate. This slot 72 allows a lost or inoperative travel of the plate 66 and of the rod 32 relative to the hook 60.

The transmission link 68 is connected to the plate 66 by means of a stud 74 fixed to the plate 66 and slidably mounted in an end slot 76 in the transmission link 68. This slot 76 permits a lost or inoperative travel of the link 68 relative to the plate 66 when the rear leg 20 pivots between its active position and its retracted position.

The connecting element 38, the control linkage 46 and the means 58 for immobilizing this linkage are arranged symmetrically in each right and left part of the seat structure.

The means 36 controlling the unlocking of the locks 28 of the two rear legs comprise a common control lever 78 mounted on the backrest 16 to be pivotable between a position of rest, such as that shown in FIG. 9 to which the lever 78 is resiliently biased by a spring 80, and an active position such as that shown in particular in FIG. 10.

The control lever 78 is connected to the rods 32 of the locks 28 by a control linkage 82.

The control lever 78 is provided with an actuating knob 83 which is accessible from the rear part of the backrest 16.

The control linkage 82 comprises an intermediate linkage 84, a part of which is common to the two locks 28 and connects the control lever 78 to the shifting plate 66.

The intermediate linkage 84 comprises, associated with each lock 28, a cranked link 86 (see FIG. 9) in the form of a bent metal wire connecting the plate 66 to a crank arm 88 pivotally mounted on the corresponding boom M of the frame. The arm 88 is connected to rotate with a coupling bar 90 for coupling the associated control linkage elements to each lock 28.

The cranked link 86 is connected to the plate 66 by means of a slot 92 provided in the plate and allowing a lost or inoperative travel of the link 86 relative to the plate 66.

This lost travel allows, when the rod 32 of the corresponding lock is in the unlocking position, the return of the control lever 78 to the position of rest.

Note that the return or biasing spring 64 for the hook 60 is connected, on one hand, to a loop 93 forming the crank of the link 86, and, on the other hand, to the arm 70.

It will be understood that the cranked link 86 and the crank arm 88 are symmetrically arranged in each right and left part of the seat structure 10.

The intermediate linkage 84 further comprises a rectilinear link 94 common to the two locks 28 and provided with a first end connected to the right crank arm 88 and a second end connected to the control lever 78 by means 96 for locking this control lever 78 in the position of rest when the backrest 16 is in a position adapted to receive an occupant, With reference in particular to FIG. 7 and FIGS. 12 to 14, it can be seen that the locking means comprise a pivot pin 98 carried by the second end portion of the link 94 and movably mounted in two locking slots 100, 102 which are movable relative to each other.

A first substantially rectilinear slot 100 is provided in the right boom M of the frame. The second generally curved slot 102 is provided in a member rigid with the control lever 78.

Figure 14:
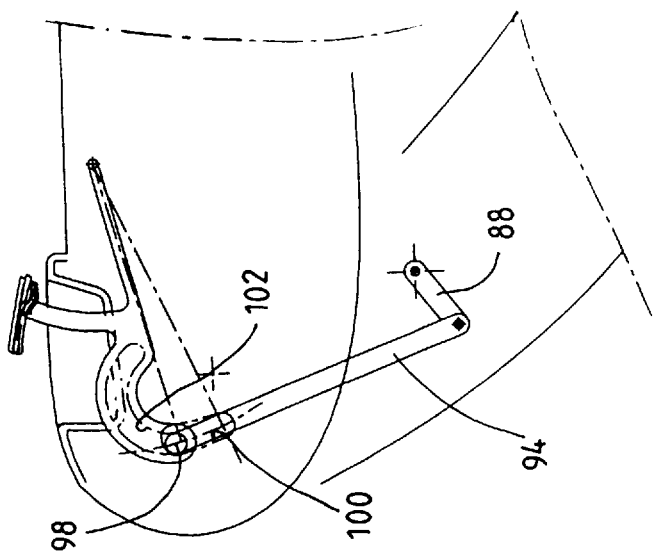
FIGS. 12 to 14 are diagrammatic detail views of the locking slots of the control lever in different relative positions of these slots.
Figure 13:
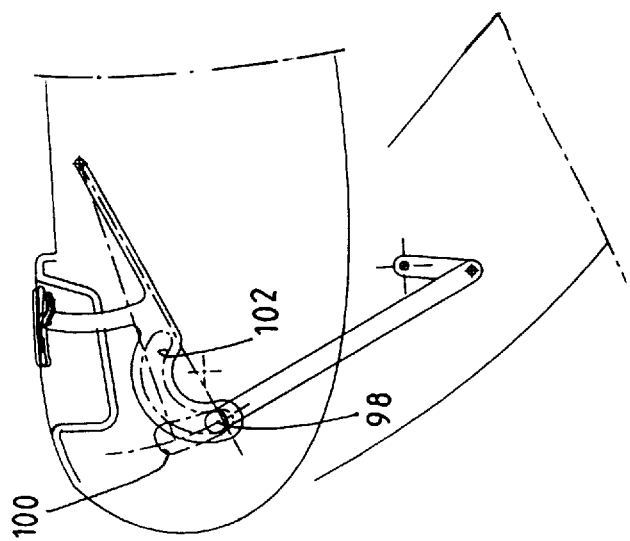
Figure 12:
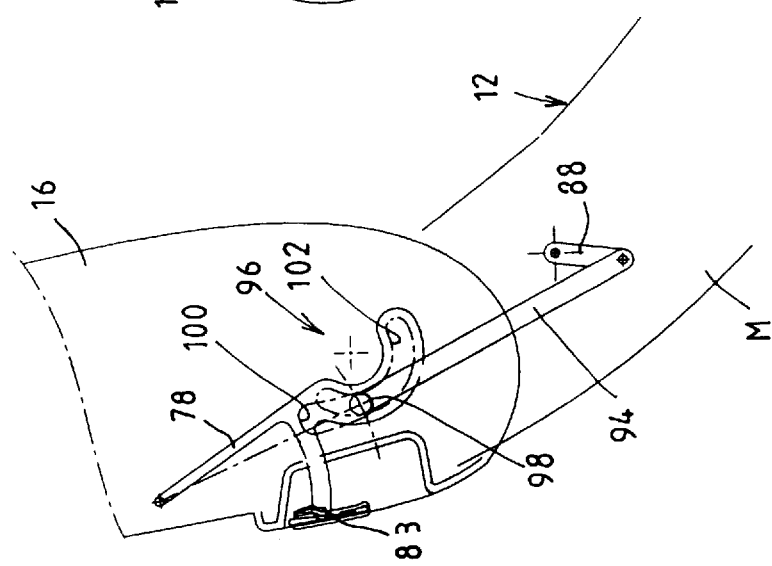

With reference to FIGS. 12 to 14, it can be seen that the relative orientation of the locking slots 100, 102 is compatible with a displacement of the pivot pin 98 they guide solely when the backrest 16 is in a position inadapted to receive an occupant, in particular in the "table" position such as that shown in FIGS. 13 and 14. When the backrest 16 is in a "normal" position as shown in FIG. 12, the pivot pin 98 is immobilized and thereby locks the control lever 78 in the position of rest.

The operation of the seat structure 10 according to the invention will now be described. For this purpose, there will first of all be described the separation of the seat structure 10 from the floor 26 and then the mounting of this seat structure in position on the floor 26.

Initially, the seat structure 10 is fixed to the floor 26, as shown in FIGS. 1 and 17. In particular, the locks 28 of the rear legs 20 are locked in the floor 26, as shown in FIG. 16.

The backrest 16 is in its substantially vertical "normal" position adapted to receive a passenger.

With reference to FIG. 12, it can be seen that, in this case, the relative position of the locking slots 100, 102 prevent the displacement of the control lever 78 and of the pivot pin 98. The control lever 78 is consequently immobilized in its position of rest.

To permit the release of the control lever 78, the backrest 16 must be pivoted into a position inadapted to receive an occupant, for example, the "table" position illustrated in the FIGS. 2, 7 and 9.

In this case, the relative position of the locking slots 100, 102 is that shown in FIG. 13. This relative position permits shifting lever 78, by pulling the knob 83 away from the backrest 16, from its position of rest shown in FIG. 13 to its active position shown in FIG. 14. In the course of the displacement of the control lever 78, the pivot pin 98 travels along the length of the slot 100 carried by the boom M of the frame.

For the aforementioned reasons of symmetry, only the right part of the seat structure will be considered hereinafter.

The displacement of the control lever 78 to its active position causes, through the medium of the intermediate linkage 84, the plate 66 and the transmission linkage 62, the raising of the rod 32 of the lock 28 from its locking position illustrated in FIGS. 9 and 16, to its unlocking position illustrated in FIG. 10. It is now possible to release the lock 28 and separate the rear leg 20 from the floor 26.

In accordance with the conventional operation of the lock 28, the rod 32 is automatically maintained in the unlocking position as shown in FIG. 15.

The upward pivoting of the plate 66, which occurs under the effect of the pull exerted on the intermediate linkage 84, causes the displacement of the hook 60 from its position for releasing the articulation pin 52 as illustrated in FIG. 9, to its position for immobilizing this pin as illustrated in FIG. 10. The latter position of the hook 60 is for example, determined by a stop 104 rigid with the boom M of the frame.

When the hook 60 is in the immobilizing position, the control linkage 46 is immobilized, which prevents the displacement of the backrest 16 relative to the seat.

Note that the lost travel of the plate 66 relative to the hook 60, determined by the rectangular slot 72, delays the displacement of the hook 60 to its immobilizing position relative to the displacement of the control lever 78.

Note also that, after having effected the unlocking of the lock 28 and after having released the control lever 78, the latter automatically returns to the position of rest under the effect of the return or biasing spring 80. The slot 92 of the plate 66 allows the return of the control lever 78 to the position of rest when the rod 32 is in the unlocking position.

The seat structure 10 is then placed in its folded-up configuration for taking up a reduced space on the floor as shown in FIGS. 6, 11 and 18, by pivoting the frame 12 about the pivot axis defined by the articulations 22 connecting the front legs 18 to the booms M of the frame.

In the course of this operation, the rear leg 20 is automatically shifted to its retracted position in the corresponding boom M of the frame under the effect of the connecting element 38 and the return spring 44.

It will be oberved that the slot 76 of the cranked link 68 allows a lost travel of this link relative to the plate 66 when the rear leg 20 is moved to its retracted position.

To remove the whole of the seat structure 10 from the floor 26, it is sufficient to unlock the locks of the front legs 18 with the aid of known means described and illustrated for example in the French patent application No 94 15 133 in the name of the Applicant.

According to the invention, the seat structure 10 is placed in position and fixed to the floor 26 by operations which are the reverse of those previously described.

However, it will be observed that, in the course of the fixing of a lock 28 of a real leg, the rectangular slot 72 permits a complete descent of the rod 32 of this lock to its locking position before the displacement of the corresponding hook 60 to its position in which it releases the articulation pin 52. In this way, the backrest 16 can only be unlocked when the rod 32 of each of the locks has reached its locking position.

Note moreover that, if the rod 32 of one of the two locks 28 is not in its locking position, the unlocking of the backrest 16 cannot occur.

Note also that the slot 92 of the plate 66 ensures the independence of the positions of the rods 32 of the locks 28.

The seat structure according to the invention has many advantages.

In particular, it permits securing a seat structure having a variable configuration in a very reliable manner to the floor of the passenger compartment or cell. Indeed, in the event that the rear legs of the seat structure fail to be fixed to the floor, the backrest is immobilized in a position inadapted to receive an occupant so that the seat cannot be used so long as the rear legs remain unfixed.

Consequently, there is no risk of a passenger being placed in a seat structure which has not been fixed correctly to the floor.

What is claimed is:

1. A seat structure having a variable configuration for a motor vehicle, said seat structure comprising a frame carrying a seat, a backrest and a leg said seat being movably mounted in the frame, said backrest being mounted to be pivotable on said frame between at least one position adapted to receive an occupant and at least one position inadapted to receive the occupant, and a ball-type lock associated with said leg for fixing said seat structure to a floor of the vehicle, said lock comprising a rod movable between a lock locking position and a lock unlocking position, a mobile control linkage connecting said seat to said backrest for ensuring that the position of said seat relative to the frame is governed by the position of said backrest relative to the frame, said seat structure further comprising means for immobilizing said control linkage when said backrest is in a position inadapted to receive an occupant and said rod is in said unlocking position.

2. Seat structure according to claim 1, wherein said control linkage comprises a guide connected to said frame, an articulation pin slidably mounted in said guide, and said immobilizing means comprise a hook mounted on said frame to be pivotable between a position for immobilizing and a position for releasing said articulation pin, and a transmission linkage connecting said rod to said hook for transmitting movements of said rod to said hook, first means for resiliently biasing said rod to said locking position thereof, second means for resiliently biasing said hook to said immobilizing position thereof, said first biasing means opposing said second biasing means, the force exerted by said first biasing means being greater than the force exerted by said second biasing means.

3. Seat structure according to claim 2, wherein said transmission linkage comprises a shifting plate for shifting said hook and pivotally mounted on said frame, a link connecting said plate to said rod, and an arm connected to rotate with said hook connecting said plate to said hook.

4. Seat structure according to claim 3, comprising an opening provided in said plate for connecting said arm to said plate and allowing a lost travel of said plate and of said rod relative to said hook.

5. Seat structure according to claim 4, wherein said leg is mounted on said frame to be pivotable between an active position and a retracted position, an end slot being provided in said link for connecting said transmission link to said plate, said end slot permitting a lost travel of said transmission link relative to said plate when pivoting said leg.

6. Seat structure according to claim 3,. wherein said leg is mounted on said frame to be pivotable between an active position and a retracted position, an end slot being provided in said link for connecting said transmission link to said plate, said end slot permitting a lost travel of said transmission link relative to said plate when pivoting said leg.

7. Seat structure according to claim 1, comprising means for controlling the unlocking of said lock including a control lever mounted on said backrest to be pivotable between a position of rest and An active position, biasing means for biasing said control lever to said position of rest, and a control linkage connecting said control lever to said rod of said lock.

8. The seat structure according to claim 7, wherein said control linkage comprises a guide connected to said frame, an articulation pin slidably mounted in said guide, and said immobilizing means comprise a hook mounted on said frame to be pivotable between a position for immobilizing and a position for releasing said articulation pin, and a transmission linkage connecting said rod to said hook for transmitting movements of said rod to said hook, first means for resiliently biasing said rod to said locking position thereof, second means for resiliently biasing said hook to said immobilizing position thereof, said first biasing means opposing said second biasing means the force exerted by said first biasing means being greater than the force exerted by said second biasing means; and wherein said transmission linkage comprises a shifting plate for shifting said hook and pivotally mounted on said frame, a link connecting said plate to said rod, and an arm connected to rotate with said hook connecting said plate to said hook, and said control linkage which connects said control lever to said rod comprises an intermediate linkage connecting said control lever to said shifting plate.

9. Seat structure according to claim 8, wherein a slot provided in said plate connects said intermediate linkage to said plate, said slot permitting a lost travel of said intermediate linkage relative to said plate, said lost travel allowing, when said rod is in said unlocking position thereof, the return of the control lever to said position of rest.

10. Seat structure according to claim 9, comprising means for locking said control lever when said backrest is in a position adapted to receive an occupant.

11. The seat structure according to claim 9, wherein said leg forms a first leg of first and second lateral legs carried by said frame, each lateral leg being provided with an identical ball-type lock, said seat structure further comprising a crank arm pivotally mounted on said frame and connected to rotate with a bar coupling said intermediate linkage with a control linkage associated with said lock of said second lateral leg, said intermediate linkage of said first lateral leg being connected to said crank arm.

12. Seat structure according to claim 8, comprising means for locking said control lever when said backrest is in a position adapted to receive an occupant.

13. The seat structure according to claim 12, wherein said leg forms a first leg of first and second lateral legs carried by said frame, each lateral leg being provided with an identical ball-type lock, said seat structure further comprising a crank arm pivotally mounted on said frame and connected to rotate with a bar coupling said intermediate linkage with a control linkage associated with said lock of said second lateral leg, said intermediate linkage of said first lateral leg being connected to said crank arm.

14. The seat structure according to claim 8, wherein said leg forms a first leg of first and second lateral legs carried by said frame, each lateral leg being provided with an identical ball-type lock, said seat structure further comprising a crank arm pivotally mounted on said frame and connected to rotate with a bar coupling said intermediate linkage with a control linkage associated with said lock of said second lateral leg, said intermediate linkage of said first lateral leg being connected to said crank arm.

15. Seat structure according to claim 14, wherein said two lateral legs form rear legs of said seat articulated to said frame, said seat structure further comprising two front legs articulated to said frame, and means for ensuring that the position of said rear legs relative to said frame is governed by the position of said front legs relative to said frame.

16. Seat structure according to claim 7, comprising means for locking said control lever when said backrest is in a position adapted to receive an occupant.

17. Seat structure according to claim 16, wherein said control lever locking means comprise a locking slot carried by said frame, a locking slot carried by said control lever, a pivot pin of said control linkage movably mounted in and guided by said two locking slots which are movable relative to each other, the relative orientation of said locking slots being compatible with a displacement of said pin solely when said backrest is in a position inadapted to receive an occupant.

18. The seat structure according to claim 16, wherein said leg forms a first leg of first and second lateral legs carried by said frame, each lateral leg being provided with an identical ball-type lock, said seat structure further comprising a crank arm pivotally mounted on said frame and connected to rotate with a bar coupling said intermediate linkage with a control linkage associated with said lock of said second lateral leg, said intermediate linkage of said first lateral leg being connected to said crank arm.

19. Seat structure according to claim 1, wherein said backrest is movable to two successive positions adapted to receive an occupant.

20. Seat structure according to claim 1, wherein said backrest is movable to two successive positions inadapted to receive an occupant.

* * * * *